United States Patent
Hong

(10) Patent No.: US 9,897,148 B2
(45) Date of Patent: Feb. 20, 2018

(54) REDUCER OF ELECTRIC POWER-ASSISTED STEERING APPARATUS

(71) Applicant: MANDO CORPORATION, Gyeonggi-do (KR)

(72) Inventor: Seung Joon Hong, Seoul (KR)

(73) Assignee: MANDO CORPORATION, Gyeonggi-Do (KR)

( * ) Notice: Subject to any disclaimer, the term of this patent is extended or adjusted under 35 U.S.C. 154(b) by 0 days.

(21) Appl. No.: 15/153,660

(22) Filed: May 12, 2016

(65) Prior Publication Data
US 2016/0332659 A1 Nov. 17, 2016

(30) Foreign Application Priority Data

May 14, 2015 (KR) .......................... 10-2015-0067260

(51) Int. Cl.
*B62D 5/04* (2006.01)
*F16D 3/00* (2006.01)

(52) U.S. Cl.
CPC ............. *F16D 3/00* (2013.01); *B62D 5/0409* (2013.01)

(58) Field of Classification Search
CPC ... B62D 5/0409; B62D 5/0403; B62D 5/0454
See application file for complete search history.

(56) References Cited

U.S. PATENT DOCUMENTS

| 8,764,574 | B2 * | 7/2014 | Zhao | F16D 3/68 |
| | | | | 464/158 |
| 8,905,185 | B2 * | 12/2014 | Ko | B62D 5/0409 |
| | | | | 180/444 |
| 9,205,861 | B2 * | 12/2015 | Kim | F16D 3/68 |
| 9,527,523 | B2 * | 12/2016 | Chae | B62D 5/04 |
| 2012/0322566 | A1 * | 12/2012 | Kim | B62D 5/0409 |
| | | | | 464/88 |

FOREIGN PATENT DOCUMENTS

| CN | 101590871 | 12/2009 |
| CN | 102837726 | 12/2012 |
| CN | 202827712 | 3/2013 |
| FR | 2844497 | 3/2004 |
| JP | 2009-120096 | 6/2009 |
| KR | 10-1424849 | * 8/2014 |

OTHER PUBLICATIONS

Office Action dated Nov. 27, 2017 for Chinese Patent Application No. 201610320378.9 and its English machine translation by Global Dossier.

* cited by examiner

*Primary Examiner* — Kevin Hurley
(74) *Attorney, Agent, or Firm* — Ladas & Parry LLP

(57) ABSTRACT

The present invention relates to a reducer of an electric power-assisted steering apparatus. An embodiment of the present invention provides a reducer that includes: a worm shaft configured to mesh with a worm wheel; a worm shaft bush configured to be coupled to an outer periphery of an end of the worm shaft to be coupled with a motor shaft among opposite ends of the worm shaft; and a connection member configured to be coupled to an outer periphery of the worm shaft bush at one side thereof, and to be coupled to an outer periphery of the motor shaft at the other side thereof such that a torque of the motor shaft is coaxially delivered to the worm shaft.

19 Claims, 5 Drawing Sheets

REDUCER OF ELECTRIC POWER-ASSISTED STEERING APPARATUS

CROSS REFERENCE TO RELATED APPLICATION

This application claims priority from Korean Patent Application No. 10-2015-0067260, filed on May 14, 2015, which is hereby incorporated by reference for all purposes as if fully set forth herein.

BACKGROUND OF THE INVENTION

1. Field of the Invention

The present invention relates to a reducer of an electric power-assisted steering apparatus. More specifically, the present invention relates to a reducer of an electric power-assisted steering apparatus in which a worm shaft and a motor shaft are connected to each other such that, when a forward/reverse rotation is performed, vibration and noise transferred to the worm shaft and motor shaft are absorbed, and rattle noise and vibration are reduced while preventing a slip from occurring between the worm shaft and the motor shaft, thereby improving a driver's steering feeling.

2. Description of the Prior Art

FIG. 1 is a view illustrating a configuration of a conventional electric power-assisted steering apparatus. As illustrated in FIG. 1, an electric power-assisted steering apparatus 100 includes a steering wheel 102 disposed at a driver seat, a steering shaft 106 connected thereto, a steering column 130 configured to allow the steering shaft to be fixed to a vehicle body, a rack and pinion mechanism 110 including a rack gear and a pinion gear configured to convert a torque input from the steering shaft 106 into a rectilinear movement, and a rack bar 112 provided with a tie rod 122 and a knuckle arm 124 at each end thereof.

The steering column 130 includes a steering shaft 106 connected to the steering wheel 102 to be rotated together with the steering wheel 102, and, at the other side, connected to a pinion shaft 108 via a pair of universal joints 104. In addition, the pinion shaft 108 is connected to the rack bar 112 through the rack and pinion mechanism 110, and the opposite ends of the rack bar 112 are connected to vehicle wheels 126 through the tie rods 122 and the knuckle arms 124, respectively.

An auxiliary power mechanism 140 includes: a torque sensor 142 configured to sense a torque that is applied to the steering wheel 102 by the driver and to output an electric signal that is proportional to the sensed torque; an electronic control unit 144 configured to generate a control signal based on the electric signal transferred from the torque sensor 142; a motor 146 configured to generate an auxiliary power based on the control signal transferred from the electronic control unit 144; and a reducer 150 including a worm 152 and a worm wheel 156 in order to deliver the auxiliary power generated by the motor 146 to the steering shaft 106.

Accordingly, the electric power-assisted steering apparatus is configured such that a torque generated by the rotation of the steering wheel 102 is delivered to the rack bar 112 via the rack and pinion mechanism 110, and the auxiliary power generated by the motor 146 according to the generated torque is delivered to the rack bar 112. That is, the torque generated by the rotation of the steering wheel 102 and the auxiliary power generated by the motor 146 are combined with each other so as to cause the rack bar 112 to move in an axial direction.

FIG. 2 is a cross-sectional view illustrating a reducer of a conventional electric power-assisted steering apparatus. As illustrated in FIG. 2, the reducer 150 is provided with a worm shaft 254 that is formed with a worm 152, and worm shaft bearings 257 are provided at the opposite ends of the worm shaft 254 so as to support the worm shaft 254. In order to prevent the worm shaft bearing 257 from moving away in the axial direction of the worm shaft 254, a plug bolt 210 is fastened between a damping coupler 240 and the worm shaft bearing 257, and the plug bolt 210 is fixed by the plug nut 220.

The worm shaft 254 has a structure in which the worm shaft 254 is connected with the motor 146 via the damping coupler 240 such that the worm shaft 254 is rotated by the driving of the motor 146.

In addition, the worm wheel 156 is provided at one side of the outer diameter of the worm 152 to mesh with the worm 152 formed on the worm shaft 254. The worm wheel 156 has a structure to be mounted on the steering shaft 106 configured to deliver the torque of the steering wheel 102 (see FIG. 1) operated by the driver such that the torque of the worm shaft 254 applied by the driving of the motor 146 is delivered to the steering shaft 106.

The worm 152, the worm wheel 156, etc. run within a gear housing 260, and the motor 146 is provided at a side of the gear housing 260 to provide a driving force to the worm shaft 254. The gear housing 260 and the motor 146 are coupled to each other by a motor cover 230 with a bolt 250.

The reducer of the electric power-assisted steering apparatus configured as described above is configured to control the driving of the motor by an electronic control unit provided in a vehicle depending on a running condition of the vehicle, and to cause the torque of the worm shaft applied by the driving of the motor to be delivered to the steering shaft in addition to the torque of the steering wheel operated by the driver such that the driver's steering and driving conditions can be maintained smoothly and stably.

The above-described reducer of the conventional electric power-assisted steering apparatus has a problem in that, when the worm shaft and the motor shaft are connected to perform a forward/reverse rotation, vibration and noise are generated in the worm shaft and the motor shaft.

In addition, there is a problem in that, as the forward rotation and the reverse rotation are repeated, a slip occurs on the worm shaft and the motor shaft so that an unpleasant feeling may be caused to the driver due to rattle noise and vibration.

SUMMARY OF THE INVENTION

The present invention has been made in order to solve the above-mentioned problems, and is to provide a reducer of an electric power-assisted steering apparatus in which a worm shaft and a motor shaft are connected to each other such that, when a forward/reverse rotation is performed, vibration and noise transferred to the worm shaft and motor shaft are absorbed and rattle noise and vibration are reduced while preventing a slip from occurring between the worm shaft and the motor shaft, thereby improving a driver's steering feeling.

Further, the aspect of the present invention is not limited thereto, and other unmentioned aspects of the present invention may be clearly appreciated by those skilled in the art from the following descriptions.

In order to achieve such an object, an embodiment of the present invention provides a reducer of an electric power-assisted steering apparatus. The reducer includes: a worm shaft configured to mesh with a worm wheel; a worm shaft bush configured to be coupled to an outer periphery of an end of the worm shaft to be coupled with a motor shaft among opposite ends of the worm shaft; and a connection member configured to be coupled to an outer periphery of the worm shaft bush at one side thereof, and to be coupled to an outer periphery of the motor shaft at the other side thereof such that a torque of the motor shaft is coaxially delivered to the worm shaft.

According to the embodiments of the present invention, when a worm shaft and a motor shaft are connected to each other in a reducer of an electric power-assisted steering apparatus and a forward/reverse rotation is performed, vibration and noise transferred to the worm shaft and motor shaft can be absorbed and rattle noise and vibration can be reduced while preventing a slip from occurring between the worm shaft and the motor shaft, thereby improving a driver's steering feeling.

BRIEF DESCRIPTION OF THE DRAWINGS

The above and other objects, features, and advantages of the present invention will be more apparent from the following detailed description taken in conjunction with the accompanying drawings, in which.

DETAILED DESCRIPTION OF THE EXEMPLARY EMBODIMENTS

Hereinafter, some embodiments will be described in detail with reference to illustrative drawings. In the description of the elements of the present invention, terms "first", "second", "A", "B", "(a)", "(b)" and the like may be used. These terms are merely used to distinguish one component from other components, and the property, order, sequence and the like of the corresponding component are not limited by the corresponding term. It should be noted that when it is described in the specification that one component is "connected," "coupled" or "joined" to another component, a third component may be "connected," "coupled," and "joined" between the first and second components, although the first component may be directly connected, coupled or joined to the second component.

Figure 3:
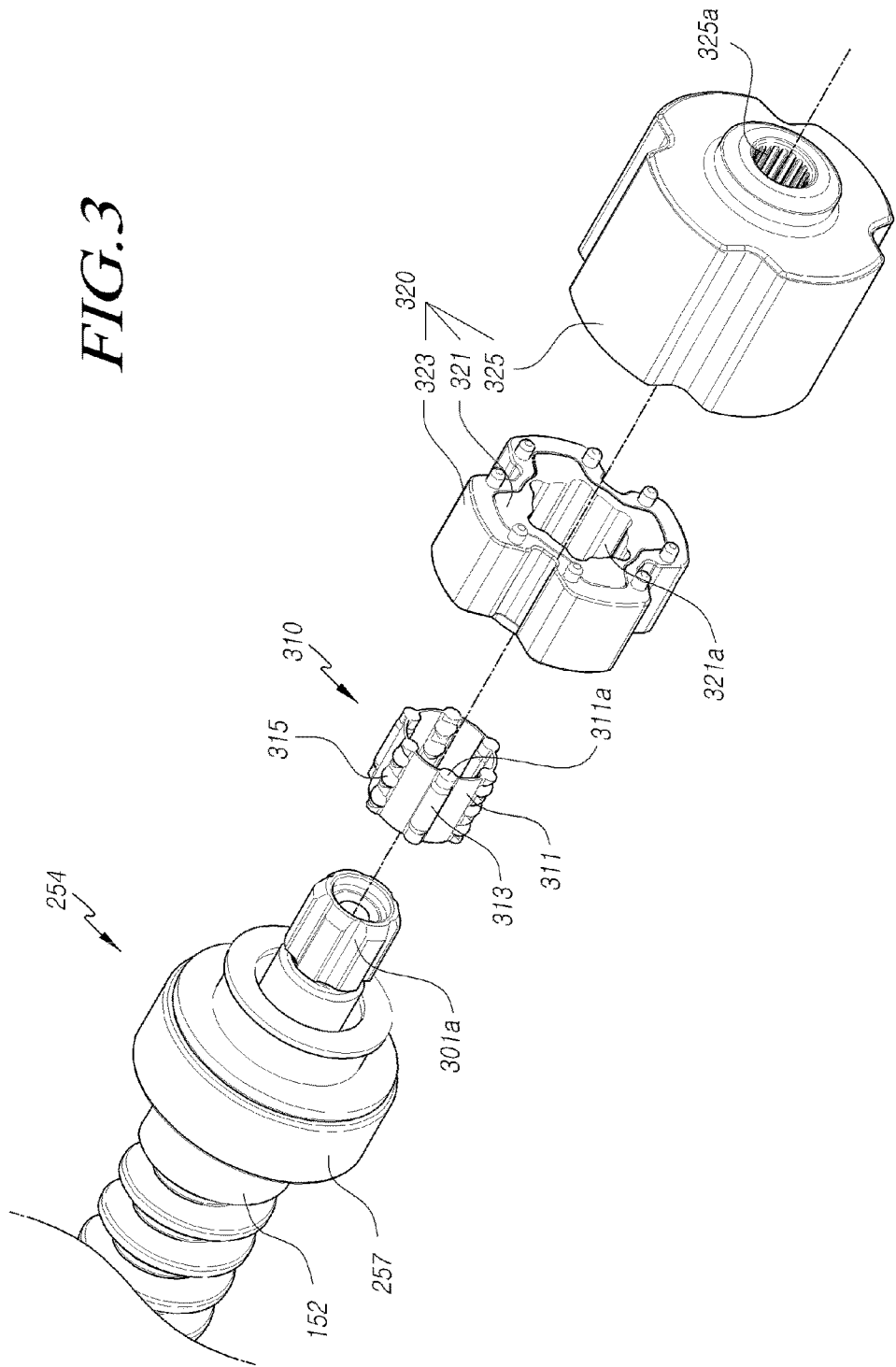
FIG. 3 is an exploded perspective view illustrating a reducer of an electric power-assisted steering apparatus according to an embodiment of the present invention.
Figure 4:
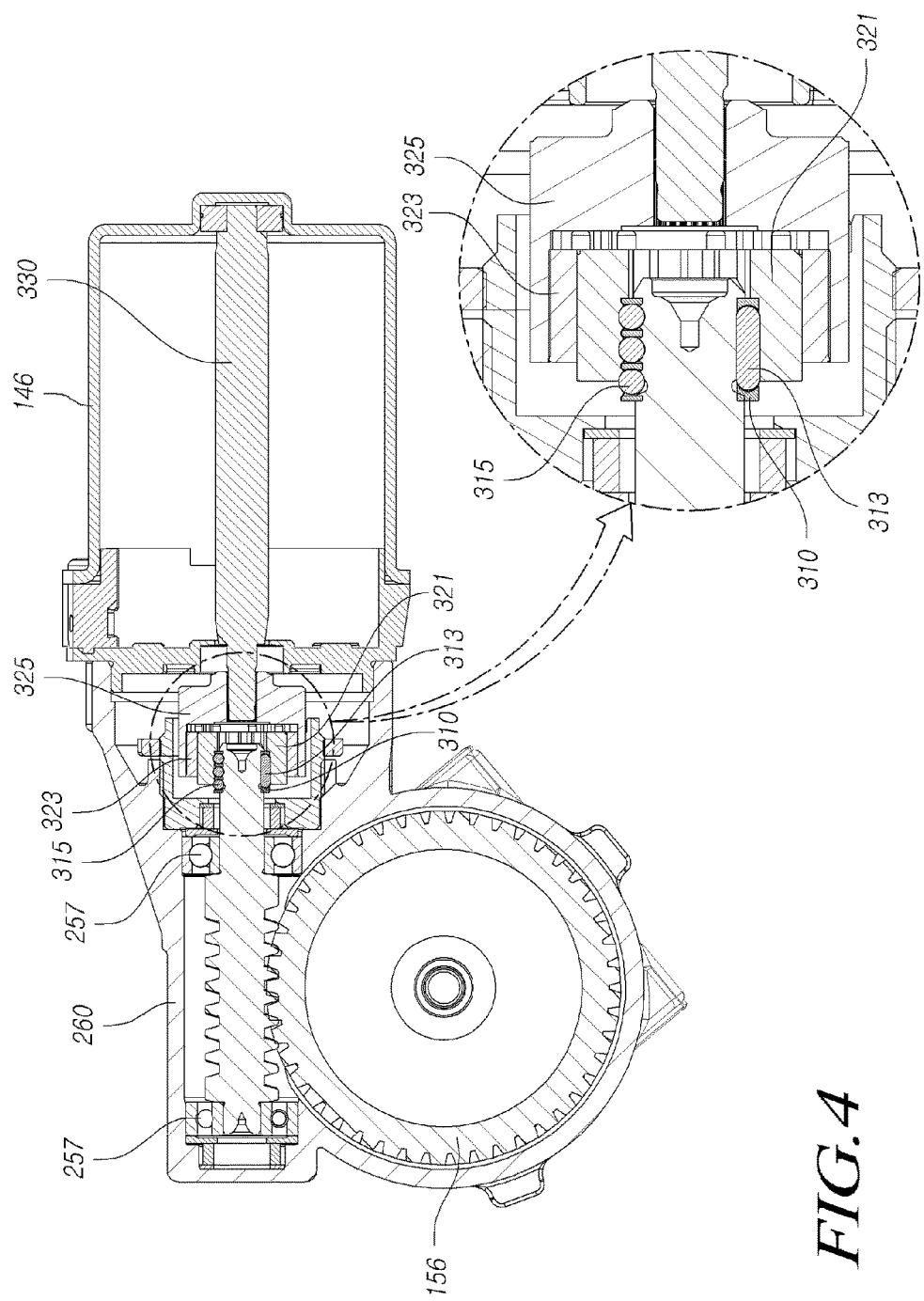
FIGS. 4 and 5 are cross-sectional views each illustrating a portion of the reducer of the electric power-assisted steering apparatus according to the embodiment of the present invention.
Figure 5:
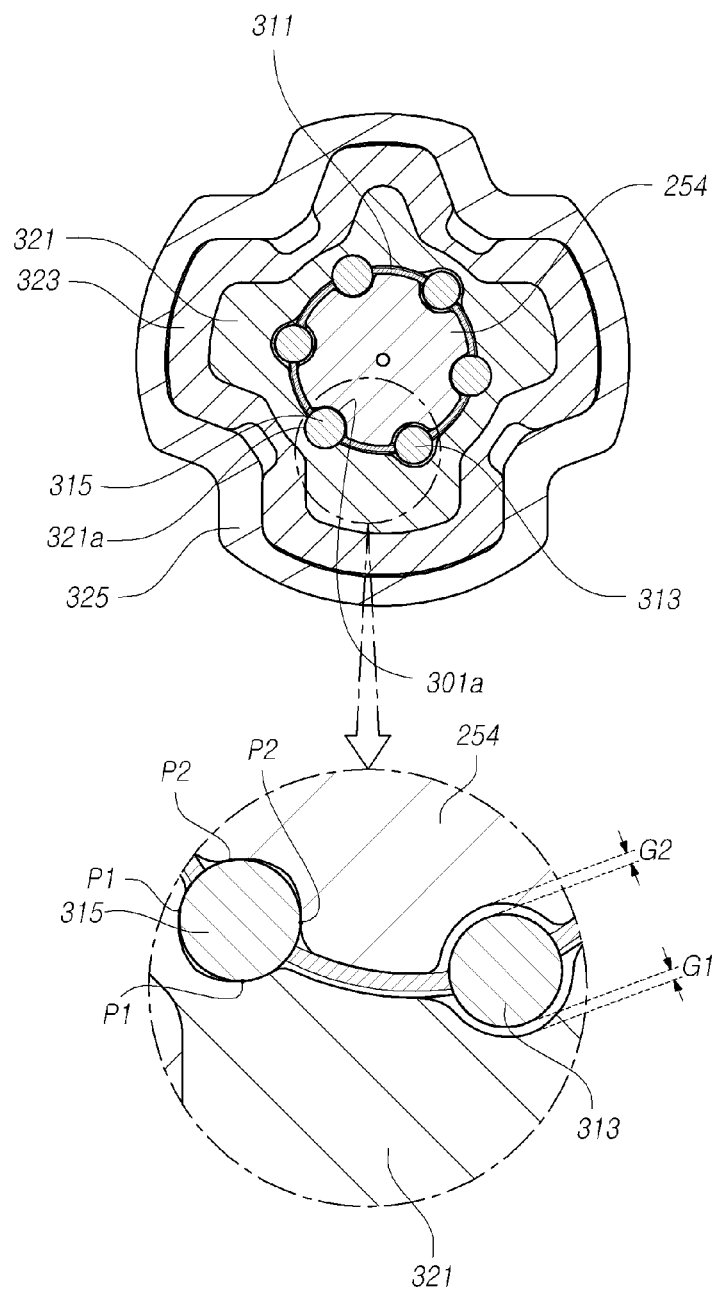

FIG. 3 is an exploded perspective view illustrating a reducer of an electric power-assisted steering apparatus according to an embodiment of the present invention. FIGS. 4 and 5 are cross-sectional views each illustrating a portion of the reducer of the electric power-assisted steering apparatus according to the embodiment of the present invention.

As illustrated in these drawings, a reducer of an electric power-assisted steering apparatus according to an embodiment of the present invention includes: a worm shaft 254 configured to mesh with a worm wheel 156; a worm shaft bush 310 coupled to an outer periphery of an end of the worm shaft 254, which is coupled with the motor shaft 330, among opposite ends of the worm shaft 254; and a connection member 320 coupled to an outer periphery of the worm shaft bush 310 at one side thereof and coupled to an outer periphery of the motor shaft 330 at the other side thereof so as to coaxially deliver a torque of the motor shaft 330 to the worm shaft 254.

A worm shaft bearing 257, which is coupled to each of the opposite ends of the worm shaft 254 to be coupled with the motor shaft 330, includes balls coupled between the inner and outer races thereof so as to support the rotation of the worm shaft 254.

Figure 2:
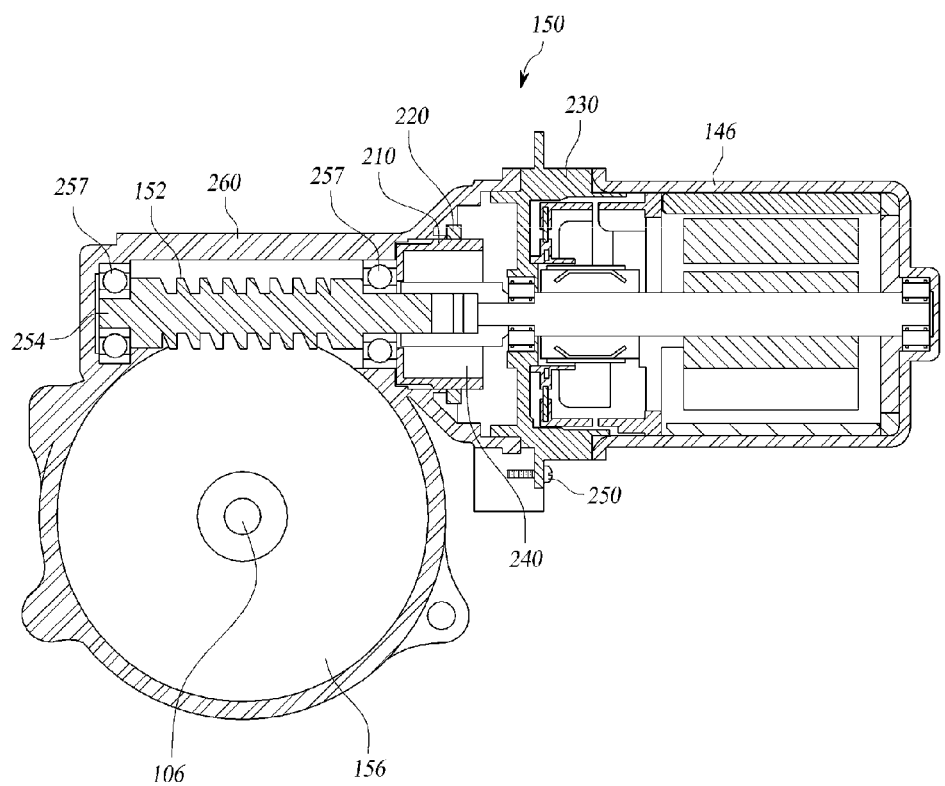
FIG. 2 is a cross-sectional view illustrating a reducer of a conventional electric power-assisted steering apparatus.

The reducer supports the driver's steering force as the worm 152 and the worm wheel 156 are caused to mesh with each other by the driving force of the motor 146 so that the worm 152 and the worm wheel 156 are interlocked with each other to rotate the steering shaft 106 (see FIG. 2). The worm shaft bearing 257 is fastened to each of the opposite ends of the worm shaft 254, which is interlocked with the motor shaft 330 when the motor 146 is driven, and supports the rotation of the worm shaft 254, and the worm wheel 156 and the worm shaft 254, which are interlocked with the steering shaft, are accommodated within the gear housing 260.

The worm shaft 254, which is interlocked and rotated with the motor shaft 330 by the motor 146, meshes with the worm wheel 156, and the worm shaft bush 310 is coupled to the outer periphery of an end of the worm shaft 254, which is coupled with the motor shaft 330, among opposite ends of the worm shaft 254, to be coupled with the connection member 320.

The connection member 320 is coupled to the outer periphery of the worm shaft bush 310 at one side thereof and is coupled to the outer periphery of the motor shaft 330 at the other side so that the worm shaft 254 and the motor shaft 330 are coaxially connected with each other, and the torque of the motor shaft 330 is coaxially delivered to the worm shaft 254.

The worm shaft bush 310 is formed in a cylindrical shape and is provided with several ribs 311a at circumferentially spaced positions of the body 311 to be elongated in the axial direction of the body 311 while protruding toward the inner circumferential surface and the outer circumferential surface.

In addition, recesses 301a and 321a are formed on the end portion of the worm shaft 254 and the inner circumferential surface of the connection member 320, respectively, such that the ribs 311a of the worm shaft bush 310 are inserted into the recesses 301a and 321a. Thus, when the worm shaft bush 310 is coupled to the end of the worm shaft 254, the inner circumferential sides of the ribs 311a are inserted into the recesses 301a on the end of the worm shaft 254, and the outer circumferential sides of the ribs 311a are inserted into and engaged in the recesses 321a on the connection member 320.

In addition, since through-holes (no reference numeral is assigned) are formed in the ribs 311a of the worm shaft bush 310, respectively, rolling members 315 are engaged in the through-holes such that the inner and outer sides of the rolling members 315 can be inserted into the recesses 321a of the connection member 320 and the recesses 301a of the end of the worm shaft 254, respectively.

In addition, several through-holes, in which the rolling members are engaged, may be formed to be axially spaced apart from each other and the rolling members 315 may be engaged in the through-holes, respectively.

When the rolling members 315 are engaged in this way, the assembly may be facilitated when assembling the worm shaft bush 310 to the worm shaft 254, and the worm shaft 245 and the connection member 320 can be smoothly assembled without a clearance.

In addition, since through-holes are formed in the ribs 311a of the worm shaft bush 310, respectively, the damping members 313 are engaged in the through-holes such that the inner and outer sides of the damping members 313 can be inserted into the recesses 321a of the connection member 320 and the recesses 301a of the end of the worm shaft 254, respectively.

Here, damping members 313 may be formed of a material, such as Natural Rubber (NR), Nitrile Butadiene Rubber (NBR), Chloroprene Rubber (CR), Ethylene Propylene Terpolymer (EPDM), Fluorine Rubber (FPM), Styrene Butadine Rubber (SBR), Chloro-Sulphonated Polyethylene (CSM), urethane, or silicon to have weather resistance and flexibility, thereby performing damping to absorb noise and vibration.

Here, the rolling members 315 are configured to be engaged in the recesses 301a and 321a of the worm shaft 254 and the inner member 321, respectively, while being in point contact at one or more locations, and the damping members 313 are configured to be engaged in the recesses 301a and 321a of the worm shaft 254 and the inner member 321, respectively, such that gaps are formed.

That is, the rolling members 315 are engaged to be in point contact with the recesses 321a of the inner member 321 at one or more locations, and at the same time, to be in point contact with the recesses 301a of the worm shaft 254 at one or more locations. FIG. 5 illustrates, as an example, a state in which a rolling member 315 is engaged to be in point contact with a recess 321a of the inner member 321 at two locations P1 and in point contact with a recess 301a of the worm shaft 254 at two locations P2.

In addition, a damping member 313 is engaged to form a gap G1 with a recess 321a of the inner member 321 and at the same time, to form a gap G2 with a recess 301a of the worm shaft 254.

In this way, when the rolling members 315 are engaged to be in contact with the recesses 301a and 321a of the inner member 321 and the worm shaft 254, respectively, and the damping members 313 are engaged to form gaps in the recesses 301a and 321a of the inner member 321 and the worm shaft 254, respectively, the connection part between the worm shaft 254 and the motor shaft 330 are bent to a predetermined angle even if a pivot movement occurs when the motor 146 is operated so that vibration and noise can be absorbed.

That is, when the connection part between the worm shaft 254 and the motor shaft 330 is pivoted while being bent to a predetermined angle, the rolling members 315 maintain the contact state between the inner member 321 and the worm shaft 254. However, the damping members 313 are elastically deformed by being bent to the same angle to come in contact with, and to be supported by, the inner member 321 and the worm shaft 254 so that vibration and noise can be absorbed.

Accordingly, the damping members compressively abut against the recesses 321a of the connection member 320 and the recesses 301a of the end of the worm shaft 254 to come in close contact with the recesses 321a of the connection member 320 and the recesses 301a of the end of the worm shaft 254, thereby absorbing the vibration and noise transferred to the worm shaft 254 and the motor shaft 330. Consequently, it is possible to reduce the rattle noise and vibration while preventing a slip from occurring between the worm shaft 254 and the motor shaft 330.

In addition, through-holes may be formed in the ribs 311a of the worm shaft bush 310. In such a case, a damping member 313 may be engaged in a through-hole formed in any one rib 311a among several ribs 311a to be inserted into a recess 321a of the connection member 320 and a recess 301a of the end of the worm shaft 254, and a rolling member 315 may be engaged in the through-hole formed in a circumferentially neighboring rib 311a to be inserted into a recess of the connection member 320 and a recess of the end of the worm shaft 254.

That is, the damping members 313 and the rolling members 315 are engaged in the ribs 311a to be alternately arranged in the circumferential direction so that, when the worm shaft bush 310 is coupled to the worm shaft 254, the worm shaft bush 310 can be coupled without being biased from the center to any one side, and an elastic support force can be evenly maintained in a diametric direction.

That is, for example, as illustrated in FIGS. 3 and 5, six (6) ribs 311a may be formed on the worm shaft bush 310, and the rolling members 315 may be coupled to three (3) ribs 311a and the damping members 313 may also be coupled to three (3) ribs 311a such that the rolling members 315 and the damping members 313 may be alternately arranged in the circumferential directions in the ribs 311a.

As the rolling members 315 are coupled to three ribs to support the inner member 321 and the worm shaft 254 and one damping member 313 is disposed between each two adjacent rolling members 315, even if the connection part between the worm shaft 254 and the motor shaft 330 is bent to a predetermined angle to generate a pivot movement, the rolling members 315 maintain the state of being in contact with the inner member 321 and the worm shaft 254, and the damping members 313 are elastically deformed to come in contact with the inner member 321 and the worm shaft 254 so that vibration and noise can be efficiently absorbed.

However, the present invention is not necessarily limited to this. For example, in the case where three (3) ribs 311a are formed on the worm shaft bush 310, a rolling member 315 may be coupled to one (1) rib 311a, and damping members 313 may be engaged in the remaining two (2) ribs 311a, respectively. In another embodiment, a damping member may be coupled to one (1) rib 311a, and the rolling members 315 may be coupled to the other two ribs 311a. Other embodiments may also be adopted.

Meanwhile, the connection member 320 includes an inner member 321, an outer member 325, and an elastic member 323, and includes shapes that protrude diametrically to be orthogonal to each other from the central hole in order to prevent a rotational slip from occurring among the inner member 321, the outer member 325, and the elastic member 323.

The inner member 321 is formed of a metal or a sintered material, and recesses 321a are formed on the inner peripheral surface thereof to cause the ribs 311a of the worm shaft bush 310, the rolling members 315, or the damping members 313 to be inserted into the recesses 321a such that the inner member 321 can be coupled with the outer periphery of the worm shaft bush 310.

In addition, the outer member 325 is formed of a metal or a sintered material, and is coupled to the outer periphery of the motor shaft 330. Splines 325a, which correspond to the axial splines formed on the motor shaft 303, are provided in the central coupling hole, to which the motor shaft 330 is coupled, so that a rotational slip does not occur with respect to the motor shaft 330.

In addition, the elastic member 323 is compressed and closely coupled between the inner member 321 and the outer member 325 such that the vibration and noise transferred through the worm shaft bush 310 can be absorbed when the worm shaft 254 and the motor shaft 330 are interlocked with each other to be rotated.

Here, the elastic member 323 may be formed of a material that is the same as that of the above-mentioned damping members 313. While the drawing illustrates that the elastic member 323 is formed separately from the outer member 325 and is coupled to the outer member 325 for the convenience of description, the elastic member 323 may be integrally molded between the inner member 321 and the outer member 325.

Figure 1:
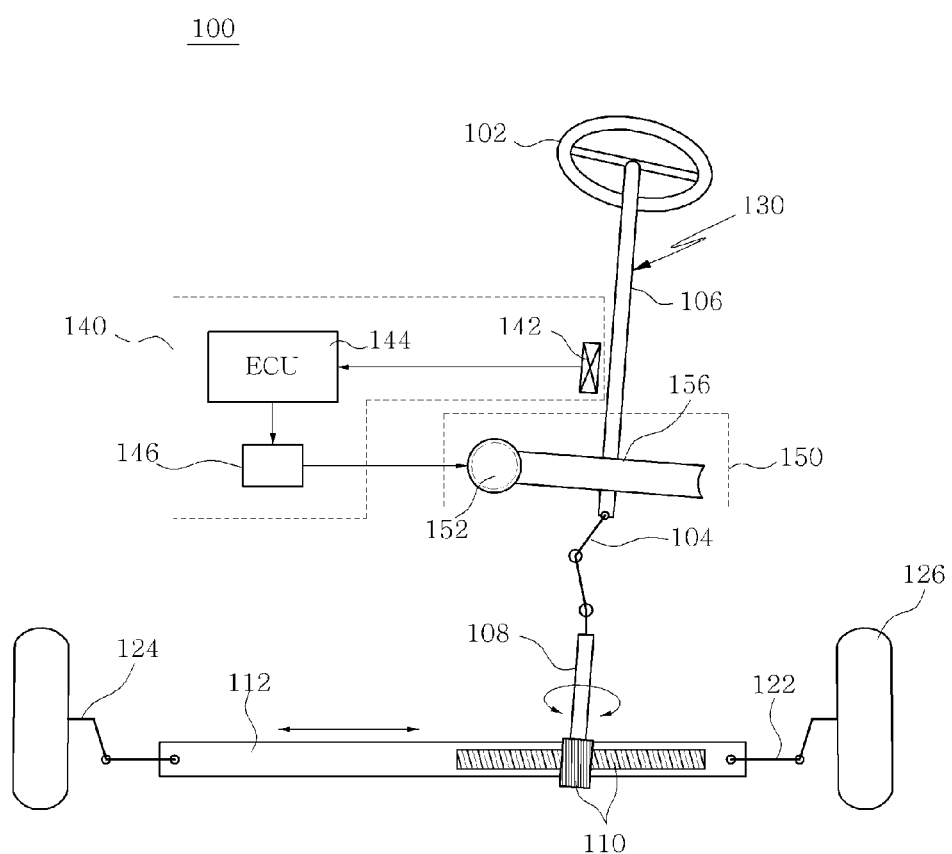
FIG. 1 is a view illustrating a configuration of a conventional electric power-assisted steering apparatus.

Meanwhile, referring to FIG. 1 as well, the reducer according to one embodiment of the present invention will constitute an electric power-assisted steering apparatus that supports the steering force of a steering wheel via a reducer and a motor 146.

That is, an electric power-assisted steering apparatus is configured by assembling a steering shaft 106 (see FIG. 1) connected to a steering wheel, a steering column 130 (see FIG. 1) configured to fix the steering shaft to a vehicle body, a rack and pinion mechanism 110 (see FIG. 1) including a rack gear and a pinion gear that are mounted in the steering column to convert a torque input through the driving force of the motor 146 into a rectilinear movement, a rack bar 112 (see FIG. 1) that is provided with a tie rod and a knuckle arm at each of the opposite ends thereof, etc.

According to the embodiments of the present invention in the above-described shapes and configurations, when a worm shaft and a motor shaft are connected in the reducer of the electric power-assisted steering apparatus and a forward rotation and a reverse rotation are performed, vibration and noise transferred to the worm shaft and motor shaft can be absorbed and rattle noise and vibration can be reduced while preventing a slip from occurring between the worm shaft and the motor shaft, thereby improving a driver's steering feeling.

Even if it was described above that all of the components of an embodiment of the present invention are coupled as a single unit or coupled to be operated as a single unit, the present invention is not necessarily limited to such an embodiment. That is, at least two elements of all structural elements may be selectively joined and operate without departing from the scope of the present invention.

Although a preferred embodiment of the present invention has been described for illustrative purposes, those skilled in the art will appreciate that various modifications, additions and substitutions are possible, without departing from the scope and spirit of the invention as disclosed in the accompanying claims. Therefore, the embodiments disclosed in the present invention are intended to illustrate the scope of the technical idea of the present invention, and the scope of the present invention is not limited by the embodiment. The scope of the present invention shall be construed on the basis of the accompanying claims in such a manner that all of the technical ideas included within the scope equivalent to the claims belong to the present invention.

What is claimed is:

1. A reducer of an electric power-assisted steering apparatus, the reducer comprising:
   a worm shaft configured to mesh with a worm wheel and comprising recesses;
   a worm shaft bush configured to be coupled to an outer periphery of an end of the worm shaft to be coupled with a motor shaft among opposite ends of the worm shaft, the worm shaft bush comprising ribs; and
   a connection member configured to be coupled to an outer periphery of the worm shaft bush at one side thereof, and to be coupled to an outer periphery of the motor shaft at another side thereof such that a torque of the motor shaft is coaxially delivered to the worm shaft,
   wherein first through-holes are formed in the ribs of the worm shaft bush, and rolling members are engaged in the first through-holes to be inserted into the recesses of the worm shaft.

2. The reducer of claim 1, wherein the worm shaft bush is formed in a cylindrical shape and is provided with the ribs that are formed at circumferentially spaced positions to protrude toward an inner peripheral surface and an outer peripheral surface while being elongated in an axial direction, and the recesses are formed in an axial direction on the end of the worm shaft and the inner peripheral surface of the connection member such that the ribs are inserted into the recesses.

3. The reducer of claim 1, wherein the first through-holes are formed to be spaced apart from each other in an axial direction of the ribs, and the rolling members are engaged in the first through-holes, respectively.

4. The reducer of claim 1, further comprising second through-holes formed in the ribs of the worm shaft bush, wherein damping members are engaged in the second through-holes to be inserted into the recesses, respectively.

5. The reducer of claim 4, wherein the damping members and the rolling members are alternately arranged in the circumferential direction.

6. The reducer of claim 5, wherein six ribs are formed, the rolling members are coupled to three ribs, respectively, and the damping members are coupled to remaining three ribs, respectively, and the damping members and the rolling members are alternately arranged in the circumferential direction.

7. The reducer of claim 5, wherein the connection member includes an inner member coupled to the outer periphery of the worm shaft bush, an outer member coupled to the outer periphery of the motor shaft, and an elastic member interposed between the inner member and the outer member to be in close contact with the inner and outer members.

8. The reducer of claim 7, wherein the outer member includes a spline provided in a coupling hole to correspond to an axial spline formed on the motor shaft, the motor shaft being coupled to the coupling hole.

9. The reducer of claim 7, wherein the rolling members are engaged in the recesses of the worm shaft and the inner member to be in point contact with the recesses, respectively, at one or more locations, and the damping members are engaged in the recesses of the worm shaft and the inner member to form gaps with the recesses, respectively.

10. A reducer of an electric power-assisted steering apparatus, the reducer comprising:
    a worm shaft configured to mesh with a worm wheel and comprising recesses;
    a worm shaft bush configured to be coupled to an outer periphery of an end of the worm shaft to be coupled with a motor shaft among opposite ends of the worm shaft, the worm shaft bush comprising ribs; and
    a connection member configured to be coupled to an outer periphery of the worm shaft bush at one side thereof, and to be coupled to an outer periphery of the motor shaft at another side thereof such that a torque of the motor shaft is coaxially delivered to the worm shaft, wherein first through-holes are formed in the ribs of the worm shaft bush, and damping members are engaged in the first through-holes to be inserted into the recesses of the worm shaft.

11. The reducer of claim 10, wherein the worm shaft bush is formed in a cylindrical shape and is provided with the ribs that are formed at circumferentially spaced positions to protrude toward an inner peripheral surface and an outer peripheral surface while being elongated in an axial direction, and the recesses are formed in an axial direction on the end of the worm shaft and the inner peripheral surface of the connection member such that the ribs are inserted into the recesses.

12. The reducer of claim 10, wherein the second through-holes are formed in the ribs of the worm shaft bush, and the rolling members are engaged in the second through-holes to be inserted into the recesses.

13. The reducer of claim 10, wherein second through-holes are formed to be spaced apart from each other in an axial direction of the ribs, and rolling members are engaged in the second through-holes.

14. A reducer of an electric power-assisted steering apparatus, the reducer comprising:
a worm shaft configured to mesh with a worm wheel and comprising recesses;
a worm shaft bush configured to be coupled to an outer periphery of an end of the worm shaft to be coupled with a motor shaft among opposite ends of the worm shaft, the worm shaft bush comprising ribs; and
a connection member configured to be coupled to an outer periphery of the worm shaft bush at one side thereof, and to be coupled to an outer periphery of the motor shaft at another side thereof such that a torque of the motor shaft is coaxially delivered to the worm shaft,
wherein the connection member includes an inner member coupled to the outer periphery of the worm shaft bush, an outer member coupled to the outer periphery of the motor shaft, and an elastic member interposed between the inner member and the outer member to be in close contact with the inner and outer members.

15. The reducer of claim 14, wherein the worm shaft bush is formed in a cylindrical shape and is provided with the ribs that are formed at circumferentially spaced positions to protrude toward an inner peripheral surface and an outer peripheral surface while being elongated in an axial direction, and the recesses are formed in an axial direction on the end of the worm shaft and the inner peripheral surface of the connection member such that the ribs are inserted into the recesses.

16. The reducer of claim 15, wherein first through-holes are formed in the ribs of the worm shaft bush, and rolling members are engaged in the first through-holes to be inserted into the recesses of the worm shaft.

17. The reducer of claim 15, wherein second through-holes are formed in the ribs of the worm shaft bush, and damping members are engaged in the second through-holes to be inserted into the recesses, respectively.

18. The reducer of claim 15, wherein first through-holes are formed in the ribs of the worm shaft bush, and rolling members are engaged in the first through-holes to be inserted into the recesses of the worm shaft, second through-holes are formed in the ribs of the worm shaft bush, and damping members are engaged in the second through-holes to be inserted into the recesses, respectively, and the damping member and the rolling member are alternately arranged in the circumferential direction.

19. The reducer of claim 14, wherein the connection member includes shapes that protrude diametrically to be orthogonal to each other from the central hole in order to prevent a rotational slip from occurring among the inner member, the outer member, and the elastic member.

* * * * *